April 8, 1958     H. BUCK     2,830,171

CLEARANCE LAMP

Filed Nov. 18, 1955

INVENTOR.

Hershell Buck

BY

ATTORNEY

United States Patent Office 2,830,171
Patented Apr. 8, 1958

2,830,171

CLEARANCE LAMP

Hershell Buck, Toronto, Ontario, Canada, assignor to Rae Metal Industries, Ltd., Toronto, Ontario, Canada, a corporation of Canada Application November 18, 1955, Serial No. 547,789

6 Claims. (Cl. 240—8.2)

This invention relates to lamps for automotive vehicles and, more particularly, to an improved, simplified, weatherproof, and shockproof signal lamp such as a marker or clearance lamp.

Such signal lamps as presently constructed generally include a metal base or housing which may be riveted or otherwise secured to a metal supporting bracket mounted on a support surface of the vehicle. This base contains the usual bayonet type lamp socket having a one-conductor cord connected to the lamp control switch, the socket being grounded through the metal base and the support means.

The base or housing has an open outer end formed with a seating surface for the lens of the lamp, a compressible gasket usually being inserted between the lens and its seat. The lens, which is usually glass but may be made of plastic composition material, is held in position by a metal bezel ring removably secured to the base by screws or bolts.

Lamps of this type are mounted in an exposed position on the vehicle and thus subjected to vibration, shock and atmospheric conditions. As a result, the metal parts on the one hand become displaced or disarranged and on the other hand become corroded and rusted resulting not only in poor or incomplete grounding but also in relatively short life of the lamp. Even with a gasket disposed between the lens and base, it is difficult if not impossible to effectively seal the lamp interior against entry of dust and moisture. As a result, the inner surface of the lens rapidly becomes dirty and cloudy, sharply reducing the transmitted light. The necessity for frequently removing the lens for cleaning accelerates deterioration of the lamp.

In accordance with the present invention, an inexpensive, simply assembled, weatherproof signal lamp is provided by molding both the base and lens of plastic composition material in such a manner that the two parts are engageable by a snap fit providing an effective weatherproof and shockproof seal for the lamp. The base is constructed to be relatively firm yet somewhat flexible or elastic and is formed with an internal tubular boss receiving the lamp socket. The latter has an inturned annular base flange aligned with a hole in the inner end of the base, and a tubular rivet is inserted through the flange, the hole in the lamp base, and an aperture in the mounting bracket. When the rivet ends are peened over, the base is effectively metallically grounded to the support bracket. The usual assembly of single conductor cord, dielectric washer, and coil spring is mounted in the socket.

The outer end of the base has an angular peripheral flange forming a seat for the lens. The lens has an outwardly extending rim or flange seating tightly in the angular flange and snapping beneath an inner rib on the end of the outer wall of the angular flange. The slight flexibility or elasticity of the base permits such snap-in mounting of the lens while assuring a tight weatherproof seal between the base and lens.

The lens is desirably formed with converging ribs on its inner surface to refract the light, these ribs terminating at a flat at the outer end of the lens forming a clear light transmitting area.

While the mounting bracket is of metal, this does not detract from the life of the lamp as the only other exposed connection is the tubular rivet which may be of a corrosion-resistant metal such as copper, brass, or a suitable alloy. However, the mounting bracket may be molded of rigid or internally reinforced plastic composition material and the grounding connection established by a printed metallic circuit connecting the rivet to the bracket mounting fastener means.

For an understanding of the invention principles, reference is made to the following description of typical embodiments thereof as illustrated in the accompanying drawings. In the drawings.

Figure 1:
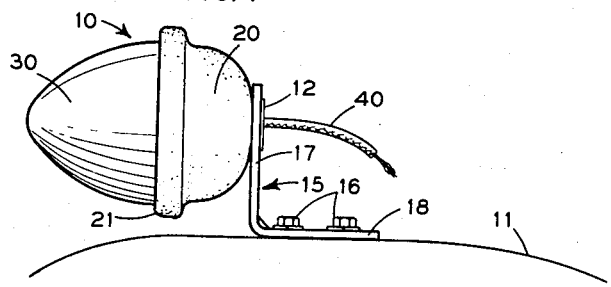
Fig. 1 is a side elevation view of one form of lamp embodying the invention.
Figure 2:
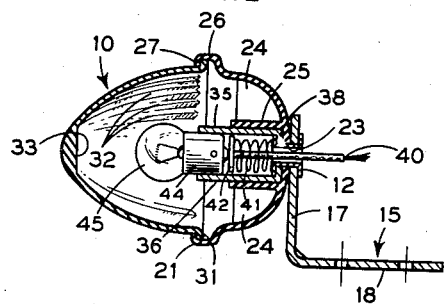
Fig. 2 is a longitudinal sectional view of the lamp.
Figure 3:
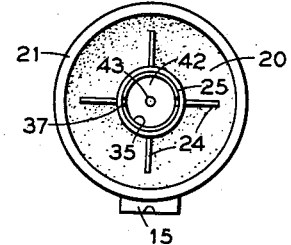
Fig. 3 is a front elevation view of the lamp with the lens and bulb removed.

Referring to Figs. 1, 2 and 3, the lamp 10 embodying the invention is illustrated as comprising a base 20 and a cover or lens 30, both molded of plastic composition materials the base being preferably of polyethylene and the lens being preferably of polystyrene. Lamp 10 is supported on a fender 11, or other supporting surface of a vehicle, by a metal angle bracket 15 secured to base 20 in a manner described more fully hereinafter. Bolt and nut assemblies 16, or other suitable fastening means such as rivets, secure bracket 15 to fender 11 and ground the bracket to the fender.

Base 20 which is preferably opaque is molded of a polyethylene or like resin so as to be relatively firm but yet somewhat flexible or elastic. The base is generally hemispherical in form and has an outwardly extending peripheral flange 21 which is angular in cross-section to form a seat for cover or lens 30. An axially inwardly extending cylindrical or tubular boss 25 is molded in base 20 in alignment with an opening 23 in the rear end of the base. Radial reinforcing webs 24 extend between boss 25 and the inner surface of the base. The base 20 may be made opaque or translucent, and may be colored white or "clear," for example, to act as a clearance light for approaching vehicles.

Lens or cover 30 is likewise substantially hemispherical in shape and is preferably transparent or translucent and is somewhat more rigid than base 20, being preferably made of a polystyrene or like resin. Lens 30 has a peripheral flange 31 with an outside diameter substantially equal to the inside diameter of the outer lip 26 of flange 21 on base 20. Thereby, due to the relative flexibility of base 20, flange 31 can be snapped into tight seating relation in flange 21, it being noted that the height of flange 31 is somewhat less than the height of lip 26, which has a shallow inturned rib 27 snapping over flange 31 to hold the parts firmly assembled.

The lens 30 is translucent and is desirably colored red or green as the case may be, to act as a warning light. The light refracting properties of the lens are enhanced by ribs 32 molded on the inner surface of lens 30 and converging to a flat 33 forming a clear light transmitting spot.

Boss 25 forms a seat for a bayonet type lamp socket 35 fitting snugly thereinto. Socket 35 has a cylindrical, outwardly opening side wall 36, formed with bayonet slots 37, and an inturned base flange 38. A hollow rivet 12 is inserted through a hole in upright arm 17 of bracket 15, through opening 23 in base 20, and through base flange 38 of socket 35. Rivet 12 is peened over at each end to connect socket 35 metallically to bracket 15.

Socket 35 contains the usual contact assembly including an insulated wire 40 extending through rivet 12, a coil spring 41, and dielectric washer 42, the wire inner end being headed against the washer, as at 43, and spring 41 seating against base flange 38 and washer 41. When the bayonet base 44 of a lamp bulb 45 is pressed into socket 35 and turned to lock the bulb in place, spring 41 is compressed to assure good electric contact between the bulb and socket.

Wire 40 acts as one conductor for lamp 45, having its headed end 43 engaging the central contact of the lamp bulb. Base 44 is grounded through socket 35, rivet 12, arms 17 and 18 of bracket 15, fasteners 16 and fender 11.

The base and cover of the lamp are inexpensively and expeditiously molded of plastic composition materials of the class and character heretofore specified. Socket 35, and its internals, are readily assembled in boss 25 of base 20 and the socket and base secured to bracket 15 by tubular rivet 12. Assembly is completed by inserting bulb 45 in socket 35 and snapping rib 31 of lens 30 into flange 21 of base 20, inturned rib 27 releasably locking the lens and base to each other.

Figure 4:
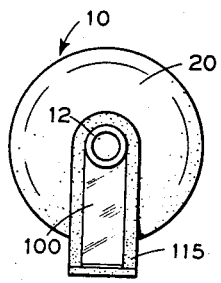
Fig. 4 is a rear elevation view of the lamp with a plastic mounting bracket.
Figure 5:
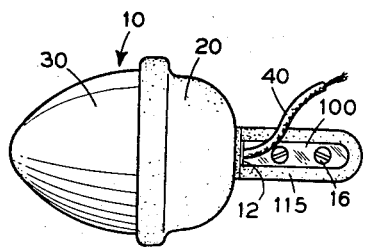
Fig. 5 is a top elevation view of the lamp of Fig. 4.

It is within the contemplation of the invention to further reduce the cost of the lamp assembly by molding the support bracket of relatively rigid plastic composition material. As shown in Figs. 4 and 5, angle bracket 115 is molded of such material and the ground connection for lamp 10 is provided by a printed metallic circuit 100 on bracket 115. Circuit 100 can be imprinted on bracket 115 by any of the known techniques, and is so disposed that it is in metal-to-metal contact with rivet 12 and fasteners 16.

While specific embodiments of the invention have been shown and described in detail to illustrate the application of the invention principles, it will be understood that the invention may be embodied otherwise without departing from such principles.

What is claimed is:

1. A vehicle lamp comprising, in combination, an integral cup-shape base of plastic composition material having at least some elasticity, and formed internally at its closed inner end with an integral outwardly extending tubular boss within the base to conformingly receive a tubular lamp socket, and with radial reinforcing webs extending between said boss and the wall of said base and integral therewith; a metal lamp socket mounted in said base and including an outwardly opening cylindrical member having an apertured base at its inner end, an annular dielectric washer, a conductor extending through said washer and headed on its outer end to form a center lamp contact, and a coil spring between said apertured base and said washer around said conductor; a relatively rigid mounting bracket formed to provide a metallic ground connection; a tubular metal rivet securing said cup shape base and socket to said bracket and metallically interconnecting said cylindrical socket member and said ground connection, said conductor extending through said rivet; and an integral cup-shape lens of plastic composition material; the outer end of said cup-shape base being formed with a seat for said lens, and the rim of said lens having a tight, weatherproof snap fit in said seat.

2. A vehicle lamp as claimed in claim 1 in which said seat comprises a radially outwardly extending annular flange on the rim of said cup-shape base.

3. A vehicle lamp as claimed in claim 1 in which said seat comprises a radially outwardly extending annular flange on the rim of said cup-shaped base having an inturned rib on its outer end, and said lens has a radially extending flange on its rim engageable beneath said rib.

4. A vehicle lamp as claimed in claim 1 in which said bracket is a metal member.

5. A vehicle lamp as claimed in claim 1 in which said bracket is molded of relatively rigid plastic composition material; and said ground connection comprises a metallic circuit printed on said bracket.

6. A vehicle lamp as claimed in claim 1 in which said lens has ribs formed on its inner surface.

References Cited in the file of this patent

UNITED STATES PATENTS

| | | |
|---|---|---|
| 1,493,988 | Kerwin | May 13, 1924 |
| 1,595,047 | Monson | Aug. 3, 1926 |
| 1,949,551 | Somervell | Mar. 6, 1934 |
| 2,099,444 | Langdon | Nov. 16, 1937 |
| 2,141,240 | Dover | Dec. 27, 1938 |
| 2,208,154 | Daehler | July 16, 1940 |
| 2,599,710 | Hathaway | June 10, 1952 |
| 2,690,503 | Garland | Sept. 28, 1954 |
| 2,702,340 | Thieblot | Feb. 15, 1955 |
| 2,730,611 | Black | Jan. 10, 1956 |